United States Patent
Hostyn et al.

(10) Patent No.: US 7,865,928 B2
(45) Date of Patent: Jan. 4, 2011

(54) SYSTEM AND METHOD OF AUDIO/VIDEO STREAMING

(75) Inventors: Tom Frans Maurits Hostyn, Halle (BE); Geert Uytterhoeven, Arschott (BE); Khac Tri Vu, Namur (BE); Shunkichi Shimizu, Tokyo (JP); Tomonobu Saito, Tokyo (JP); Tsuyoshi Oobayashi, Tokyo (JP); Takahiro Nishikawa, Tokyo (JP); Manabu Onishi, Tokyo (JP)

(73) Assignees: Sony Europe Limited, Weybridge (GB); Sony Corporation, Tokyo (JP)

( * ) Notice: Subject to any disclaimer, the term of this patent is extended or adjusted under 35 U.S.C. 154(b) by 676 days.

(21) Appl. No.: 11/777,682

(22) Filed: Jul. 13, 2007

(65) Prior Publication Data

US 2008/0022350 A1    Jan. 24, 2008

(30) Foreign Application Priority Data

Jul. 14, 2006  (EP) .................................. 06253697

(51) Int. Cl.
*H04N 7/173* (2006.01)

(52) U.S. Cl. ...................................... 725/131

(58) Field of Classification Search ................ 725/9–21, 725/86–134; 386/46; 709/231, 232, 200
See application file for complete search history.

(56) References Cited

U.S. PATENT DOCUMENTS

| 5,761,417 A * | 6/1998 | Henley et al. ............... 709/231 |
| 2004/0088741 A1 | 5/2004 | Tsai et al. |
| 2006/0095472 A1* | 5/2006 | Krikorian et al. ........ 707/104.1 |
| 2008/0052408 A1 | 2/2008 | Saito et al. |

FOREIGN PATENT DOCUMENTS

| EP | 1 638 334 A1 | 3/2006 |
| WO | WO 2004/062291 A1 | 7/2004 |

OTHER PUBLICATIONS

U.S. Appl. No. 11/764,836, filed Jun. 19, 2007, Hostyn, et al.

* cited by examiner

*Primary Examiner*—Andrew Y Koenig
*Assistant Examiner*—James Leija
(74) *Attorney, Agent, or Firm*—Oblon, Spivak, McClelland, Maier & Neustadt, L.L.P.

(57) ABSTRACT

A system and method of audio/video streaming in which a server transmits over a network an audio/video stream to a client device. The client device is able to send command data to the server causing the server to provide a change in content of the audio/video stream from a first content to a second content. Buffers in the server and client device can be flushed or skipped-over at the time of sending the command data so as to improve response time and marker data can be sent from the server to the client device to indicate the start of the second content.

13 Claims, 5 Drawing Sheets

Fig.1

SYSTEM AND METHOD OF AUDIO/VIDEO STREAMING

BACKGROUND OF THE INVENTION

1. Field of the Invention

The present invention relates to a system and method of audio/video streaming, in particular where a server and a client device are connected to a network and the server provides an audio/video stream on the network for reproduction by the client device.

2. Description of the Related Art

Systems are known in which a server or base station is connected locally and directly to audio/video equipment in the home and is also connected to a network, such as the internet. The server is able to package audio/video signals received from the local audio/video equipment for transmission over the network. In this way, a user can operate a client device, such as a Sony PlayStation Portable (PSP) (trademark) or a laptop computer connected to the network in order to receive and watch any audio/video signals available from the audio/video equipment local to the server. Systems, such as LocationFree (trademark) already provide such functionality. The server can be provided with an infrared blaster for directing remote control signals to the audio/video equipment so as to control that audio/video equipment. The client device on the network is then able to send command data over the network to the server so as to control the audio/video equipment. For instance, the client device can send command data to change the live broadcast audio/video stream being provided over the network or, where a recorded programme is being replayed, can send any of a variety of known command functions, such as pause, fast-forward, rewind etc.

In order to cope with variations in network performance, it has been proposed that the client device includes buffering between receipt of an audio/video stream from the network and reproduction to the end user. Typically, buffering of approximately 3 seconds is expected.

Because of the buffering, when changing channels etc., an end user would in the normal course expect a corresponding delay of for instance at least 3 seconds. This is clearly not a good experience for the end user and compares unfavourably with a user's expectation when changing channels on a digital or analogue receiver for receiving broadcast audio/video.

In an attempt to improve the experience of the user, it has been proposed to flush the buffering of any stored data at the time of sending the command data over the network.

OBJECTS AND SUMMARY OF THE INVENTION

The present application recognises for the first time that there are still difficulties with this system on the basis that some data of audio/video stream generated prior to the command data being sent to the service will still be present in the system and will be presented to the end user.

According to the present invention, there is provided a method of audio/video streaming including receiving an audio/video stream provided by a server over a network, processing the received audio/video stream so as to enable reproduction at a playback rate and sending command data over the network to the server causing the server to provide a change in content of the audio/video stream from a first content to a second content. It also includes buffering, in a buffer, the audio/video stream received from the network, calculating a fast forward rate of reproduction of the audio/video stream in the buffer at the time of sending the command data required to empty the buffer in a predetermined minimum time and, upon sending the command data, processing the audio/video stream in the buffer so as to reproduce the audio/video stream at said fast forward rate for at least the predetermined minimum buffer time and, if necessary, for any additional time required to reduce the buffered audio/video stream to an amount which, at the playback rate, has a playback time equal to the predetermined minimum buffer time and subsequently processing the audio/video stream in the buffer for reproduction at the playback rate.

According to the present invention, there is also provided a client device for connection to a network and for reproducing an audio/video stream received from a server on the network. The client device is arranged to connect to the network, to receive the audio/video stream, to process the received audio/video stream so as to enable reproduction at a playback rate and to send command data over the network to the server causing the server to provide a change in content of the audio/video stream from a first content to a second content. The client device includes a buffer for buffering the audio/video stream received from the network and is arranged to calculate a fast forward rate of reproduction of the audio/video stream in the buffer at the time of sending the command data required to empty the buffer in a predetermined minimum buffer time and, upon sending the command data, to process the audio/video stream in the buffer so as to reproduce the audio/video stream at said fast forward rate for at least the predetermined minimum buffer time and, if necessary, for any additional time required to reduce the buffered audio/video stream to an amount which, at the playback rate, has a playback time equal to the predetermined minimum buffer time, and subsequently to process the audio/video stream in the buffer for reproduction at the playback rate.

In this way, any audio/video data already stored in the buffer of the client device relating to the first content, in other words audio/video data produced by the server before receipt of any command data from the client device, will be skipped over in fast-forward. This reduces the latency or buffering provided by the client device so as to allow a quick response. Furthermore, the user is immediately aware of the system responding and is not presented merely with a blank display while the audio/video stream of second content is buffered. By reassessing the quantity of buffered data at the end of the predetermined minimum buffer time and continuing fast-forward playback if there is more data than expected, the arrangement provides an improvement in fast-forwarding over audio/video data of first content which was still in transit in or over the network.

According to the present invention, there is also provided a method of audio/video streaming including providing an audio/video stream to a client device on a network, responding to command data sent from the client device over the network to change the content of the audio/video stream from a first content to a second content, in a buffer, buffering an output of the audio/video stream to the network and flushing the buffer upon receipt of said command data from the client device.

According to the present invention, there is also provided a server for connection to a network and for providing an audio/video stream to a client device on the network. The server is arranged to connect to the network, to provide to the client device over the network the audio/video stream to receive command data sent from the client device and to respond to the command data by changing the content of the audio/video stream from a first content to a second content wherein the server includes a buffer for outputting the audio/video stream over the network and the server is arranged to flush the buffer upon receipt of command data from the client device.

In this way, the possible amount of audio/video data of the first content received by a client device is reduced. As soon as command data is received at the server end, any audio/video data relating to the first content at the server end is flushed and not sent to the client device over the network. This allows the overall system to provide more quickly to the end user the audio/video stream of second content.

According to the present invention, there is also provided a method of audio/video streaming including providing an audio/video stream to a client device on a network, responding to command data sent from the client device over the network to change the content of the audio/video stream from a first content to a second content and providing in the audio/video stream marker data indicating the start of the second content in the audio/video stream.

According to the present invention, there is also provided a method of audio/video streaming including receiving an audio/video stream provided by a server over a network, processing the received audio/video stream so as to enable reproduction, sending command data over the network to the server causing the server to provide a change in content of the audio/video stream from a first content to a second content and identifying in the audio/video stream marker data sent by the server indicating the start of the second content in the audio/video stream.

According to the present invention, there is also provided a server for connection to a network and for providing an audio/video stream to a client device on the network. The server is arranged to connect to the network, to provide to the client device over the network the audio/video stream, to receive command data sent from the client device and to respond to the command data by changing the content of the audio/video stream from a first content to a second content wherein the server is additionally arranged to provide in the audio/video stream marker data indicating the start of the second content in the audio/video stream.

According to the present invention, there is also provided a client device for connection to a network and for reproducing an audio/video stream received from a server on the network. The client device is arranged to connect to the network, to receive the audio/video stream, to process the received audio/video stream so as to enable reproduction and to send command data over the network to the server causing the server to provide a change in content of the audio/video stream from a first content to a second content wherein the client device is additionally arranged to identify in the audio/video stream marker data sent by the server indicating the start of the second content in the audio/video stream.

In this way, the start of the second content is identified in the audio/video stream so that the client device is able to move from reproducing the audio/video stream of the first content to the audio/video stream of the second content directly and with certainty.

Preferably, the client device includes a buffer for buffering the audio/video stream received from the network.

The client device can be arranged to flush the buffer upon receipt of the marker device.

In this way, the client device is able to identify exactly at what point the buffer should be flushed.

Preferably, the client device is arranged to buffer a predetermined amount of audio/video stream received after receipt of the marker data before reproducing any of the audio/video stream received after receipt of the marker data.

In this way, although the client device does not provide the normal steady-state buffering or latency required to take account of relatively large expected interruptions in the network, before reproducing any of the audio/video stream received after receipt of the marker data, the client device does provide sufficient buffering to take account of normal ongoing fluctuations in data rates over the network.

Rather than flushing the buffer, having buffered the predetermined amount of audio/video stream received after receipt of the marker data, the client device can merely skip all other previously buffered audio/video stream data.

Preferably, the client device is arranged to analyse each part of the buffered audio/video stream in turn and to skip parts of the buffered audio/video stream received before the marker data.

The client device could discard skipped parts of the buffered audio/video stream without reproducing them. Alternatively, it could reproduce them in fast-forward.

Preferably, where the audio/video stream comprises audio and video data carried in a plurality of consecutive audio and video packets, the marker data can be provided in a dummy audio packet indicating the start of the second content. Hence, the server is preferably arranged to create and insert such a dummy audio packet.

According to the present invention, there is also provided a tangible machine-interpretable signal including a stream of audio and video data carried in a plurality of consecutive audio and video packets, a first plurality of consecutive packets carrying audio and video data of a first content preceding a second plurality of consecutive packets carrying audio and video data of a second content, the tangible signal further including a dummy audio packet carrying the marker data indicating the start of the second plurality of consecutive packets.

The present invention can also be implemented as a computer program comprising program code means for performing the steps described above when the program is run on a server or a client device as appropriate. Similarly, the present invention can be provided as a computer program product comprising such program code means stored on a computer-readable medium.

It should be noted that reference is made throughout the description and claims to audio/video and this is intended to cover systems handling either audio or video. However, the present invention is particularly applicable to systems handling audio and video.

DETAILED DESCRIPTION OF THE PREFERRED EMBODIMENTS

The invention will be more clearly understood from the following description, given by way of example only, with reference to the accompanying drawings.

Many different types of audio/video equipment are available to consumers including television display devices, video tape recorders, video disk players and recorders, set-top boxes for receiving and decoding digital television transmissions and personal video recorders (PVRs) for instance including hard disk recording devices. These can be chosen, connected together and used according to the requirements of an end user as an audio/video system.

Figure 1:
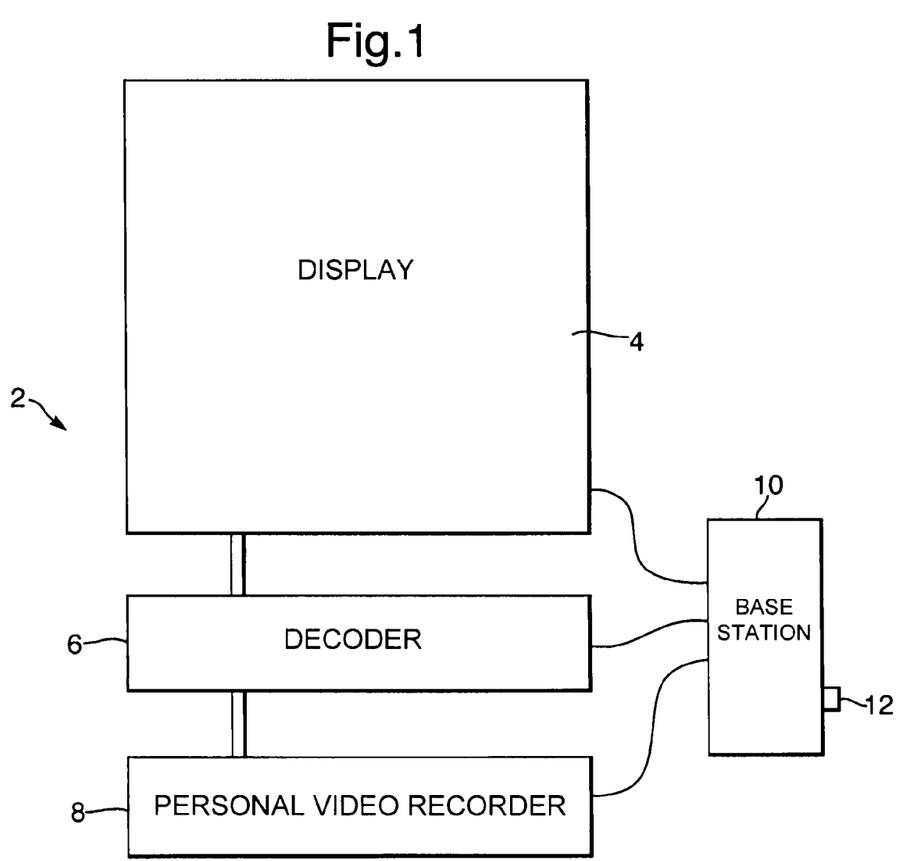
FIG. 1 illustrates a television system in conjunction with a server according to the present invention.

The example illustrated schematically in FIG. 1 of an audio/video system (2) includes a television display device for a digital television decoder (6) and a PVR (8).

As illustrated, a base station or server (10) to be described further below is connected to one or more of the audio/video outputs of the television system (2). The server (10) also includes a port or interface (12) for connection to an external network, such as the internet.

The terms client and server are used for convenience and clarity only. It is intended that the server would be part of or in communication with a source of audio/video intended to be transferred for viewing/interaction at a client device. Of course, the client may also be a source of audio/video content and may transfer a version of it to a server for viewing/interaction in some embodiments. Thus, the terms "client" and "server" can be interpreted as interchangeable. In some embodiments, client and/or servers may be nodes in a peer-to-peer network.

Figure 2:
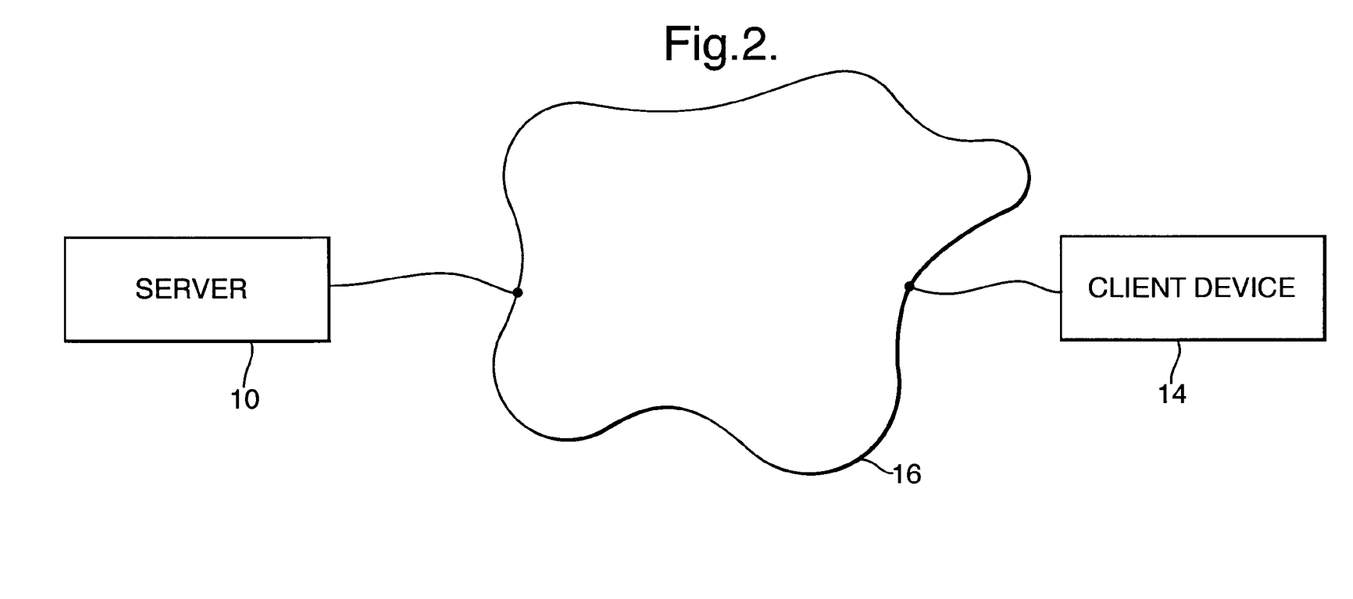
FIG. 2 illustrates a networked system embodying the present invention.

As illustrated in FIG. 2, a client device (14) is also connected to the network (16). The server (10) arranges any audio/video signal (for example digitizing analog signals) received from the television system (2) and sends data over the network to the client device (14). For instance, in the case of using the internet, the server (10) can use standard internet protocols such as TCP/IP, HTTP, RTP and RTSP. The client device (14) decodes any received data and provides it in a form for display. It is possible for the client device to provide signals for display on external devices, but preferred embodiments include integrated displays, for instance such as is the case with laptop computers and the Sony PlayStation Personal (trademark). In this way, an end user is able to enjoy live or recorded television programmes from anywhere in the world.

For completeness, it should be noted that all or part of the network (16) can be wireless and that the audio/video may traverse a wide area network (such as the Internet) or a local area network, for example within the confines of an end user's home or living room.

An important factor in determining the quality of live streaming is that the images and sounds must be continuous, with a certain video rate and audio rate. A frame that arrives too late or that does not arrive at all at the client side causes discontinuity for audio/video. In order to increase the stability of audio/video play-out rates, streaming latency is used. The streaming latency is the delay measured from the moment a frame is generated on the server side until the moment the frame is reproduced at the client side.

By buffering the data of the audio/video streams either side of the network so as to provide the required latency, it is possible to absorb any delays and unevenness within the network such that an end user of a client device receives the audio/video stream without any discontinuity.

It is proposed that buffering in the server (10) is approximately the same size as buffering in the client device (14). Where the network (16) is the internet, it is proposed to use buffering of approximately 3 seconds both in the server (10) and in the client device (14). These parameters are examples only. As will be clear from the description below, other buffering times may be achievable.

At the server (10), the data for the audio/video stream to be provided over the network (16) should be available without interruption. Hence, the one or more buffers providing buffering in the server (10) run normally in an empty state. When, due to network interruptions, it is not possible to output the data of the audio/video stream onto the network, then the buffer(s) of the server (10) begin to fill up with data until that data can be provided to the network. On the other hand, in the client device (14) the one or more buffers are allowed to fill to the proposed amount of buffering, for instance 3 seconds, before any of the audio/video stream is reproduced to the end user. Reproduction of the audio/video stream should be possible without interruption, but there may be interruption in receiving the audio/video stream from the network such that during these interruptions, the amount of buffered data will be reduced accordingly.

It will be appreciated that this buffering and high latency streaming introduces a long delay (for instance 3 seconds) at the beginning of any audio/video streaming.

It is proposed that the client device (14) should be able to send command data to the server (10) over the network (16). This command data is intended to control parts of the television system (2). The server (10) can be provided with an infrared blaster for controlling one or more of the components of the television system (2) by means of their usual remote control channels. Alternatively, the server (10) can be provided with direct links to those component parts for direct control of them.

Where the client device (14) sends command data to change channels, the high latency in the system will also introduce a long delay between the channel change request and the new channel being reproduced to the user by the client device (14). In particular, the image and sound sequences of the new channel will only be played after a delay corresponding to the latency. This produces stalled picture and sound during the period of the delay. Similar difficulties arise with any other commands which result in a change in content of the audio/video stream. For instance, the user will experience similar delays when trying to control playback of recorded audio/video sequences, for instance when attempting commands such as pause, rewind, fast-forward, advancing to chapter markers, etc. Even where the user is attempting to control part of the television system (2) without changing the television sequence being streamed to the client device (14), there may be similar problems. For instance, when adjusting the recording functions of the television system (2) using the client device (14), display information may be superimposed upon the television images to form a changed audio/video stream and it is undesirable for the user to receive those images only after the significant latency delay.

Figure 3:
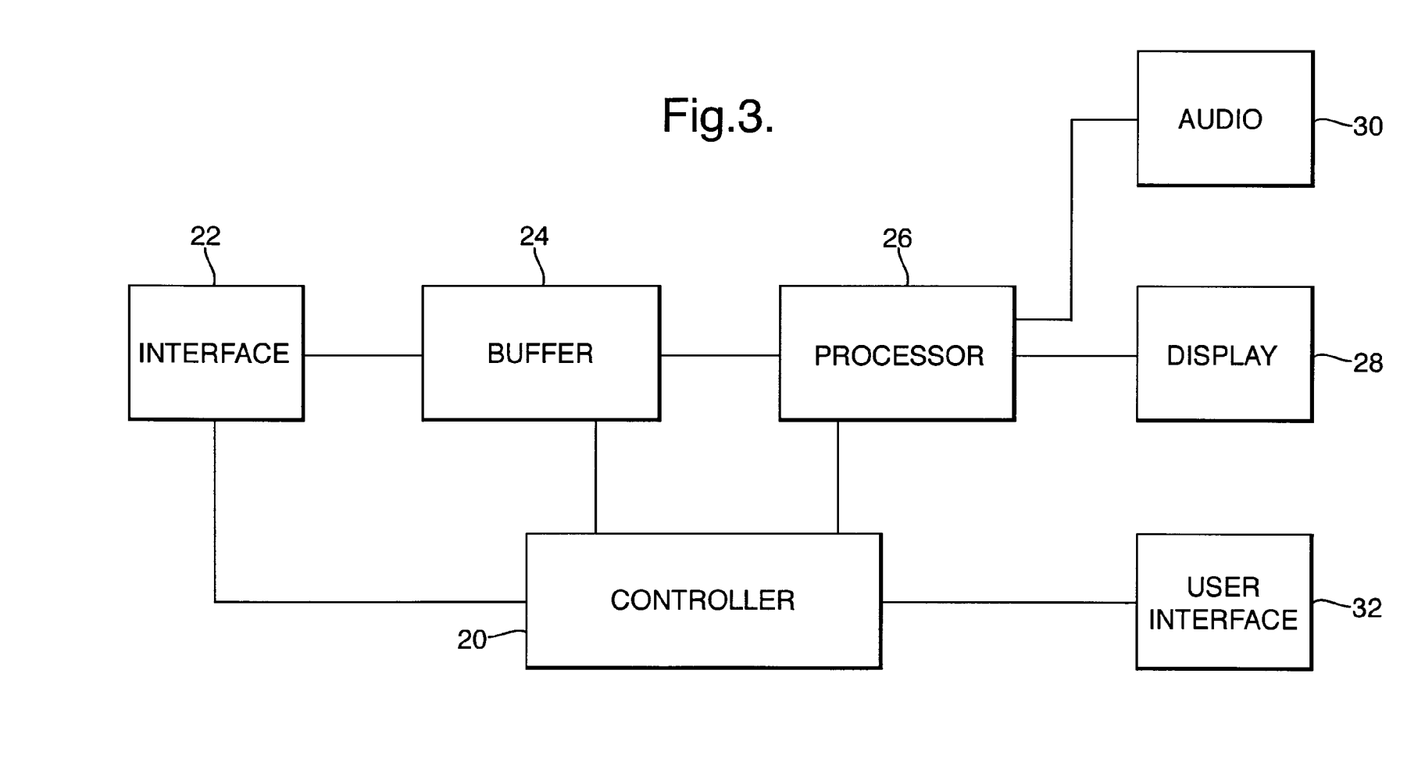
FIG. 3 illustrates schematically a client device for use in the system of FIG. 2.

FIG. 3 illustrates schematically component parts of a client device (14) embodying the present invention.

A controller (20) has overall control of the device and co-ordinates interaction of the other components.

An interface (22) is provided for connection to the network (16) and, under the control of controller (20), may operate the necessary handshakes and protocols for the network (16).

An audio/video stream taken from the network (16) by means of the interface (22) is provided to a buffer (24). As discussed above, this provides a normal buffering amount of for instance 3 seconds.

A processor (26) obtains the audio/video stream from the buffer (24) and carries out the necessary processing to provide signals to a display (28) and audio transducer (30) for reproduction of the audio/video stream to an end user. The display (28) and audio transducer (30) may be provided either separately from the client device (14) or integrally with it.

A user interface (32) allows control of the client device (14) and the server (10) by means of the controller (20). Any appropriate form of user interface can be used including those which are integrated with the display (28) as a touch-sensitive display. The user interface (32) can take the form of a graphical user interface (GUI). This may optionally simulate a conventional remote control device with buttons being replaced by virtual buttons.

In response to actuation of the user interface (32), the controller (20) causes the interface (22) to send command data in an appropriate form over the network (16) for reception by the server (10).

Figure 4:
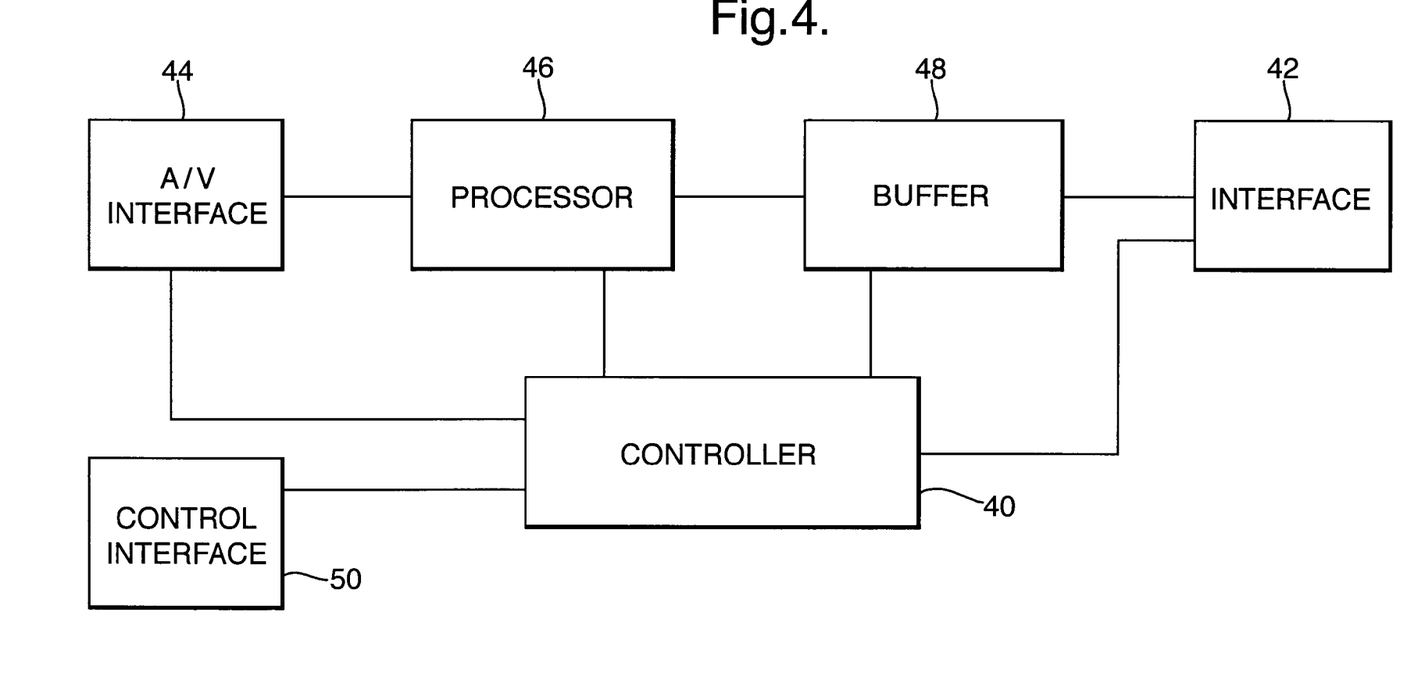
FIG. 4 illustrates a server for use in the system of FIG. 2.

FIG. 4 illustrates schematically the component parts of an embodiment of a server (10).

A controller (40) is arranged to control the other component parts.

An interface (42) is provided for connection to the network (16) and is able to communicate over the network (16) using the appropriate hand-shakes and protocols. On the other hand, an audio/video (AV) interface (44) is provided for connection to one or more component parts of the television system (2). Where connection to more than one component is possible, the controller (40) may be configured to control which audio/video signal is passed on for further processing within the server (10).

A processor (46) acquires the appropriate audio/video signal from the AV interface (44) and provides an audio/video stream to the buffer (48). The processor (46) can carry out any function as necessary, for instance carrying out an analogue to digital conversion or converting from one digital format to another. Of course, it will be appreciated that systems can be arranged with more than one processor. For example, some systems can include a specialized processor (DSP) for performing audio/video decoding.

Data is streamed from the buffer (48) through the interface (42) and onto the network (16). If there are minor interruptions in the service on the network (16) such that the interface (42) is not able to provide the data onto the network (16), the buffer (48) buffers that data until the network (16) does allow appropriate transmission of the data. As discussed above, a buffer size of approximately 3 seconds worth of audio/video stream is generally appropriate for use with the internet as the network (16).

The interface (42) is also able to receive from the network (16) command data sent from the client device (14). The command data can be interpreted by the controller (40) such that the controller (40) conducts the required operations as indicated by the user interface (32) of the client device (14) and the corresponding command data produced by the controller (20) of the client device (14).

Of course, in response to command data, the controller (40) can control operation of the server (10) itself by controlling its component parts. However, controller (40) also has command of a control interface (50). The control interface (50) may take the form of an infrared blaster which is able to produce the appropriate infrared signals for controlling one or more component parts of the television system (2). Such an arrangement is highly advantageous in that the server (10) can control any television device without the need for specially designed or implemented interfaces with that device. The controller (40) is able to use the control interface (50) to implement any of the available functionality of the component parts of the television system (2), for instance changing channels, setting record functions and playing back recorded audio/video sequences. Of course, on the other hand, where component parts of the television system (2) include appropriate communication links, the control interface (50) can make use of those links to communicate directly with the component parts of the television system (2) and to control them directly. Indeed, it is also possible for the server (10) to be integrated within the television system (2).

In operation of the server (10) and client device (14) where an audio/video stream is being provided to the client device (14) without any operation of user interface (32) of the client device (14), the system attempts to operate with the buffer (24) of the client device (14) in an approximately full state, for instance 3 seconds worth of audio/video data, and the buffer (48) of the server (10) in an approximately empty state. Hence, the audio/video stream is reproduced to the user with the intended steady state latency of for instance 3 seconds. For the sake of understanding the present invention, the content of the audio/video stream at this time can be considered to be a first content.

When the user interface (32) of the client device (14) is operated and command data is sent over the network (16) to the server (10), it is usual that the client device (14) will expect some kind of response. By way of example, this response might be a change of the live channel being streamed from the server, pausing or stopping of reproduction of a recorded television sequence, or merely superimposing control information on the television images as part of setting a recording function in one of the component parts of the television system (2) or navigating menus, including content menus for devices such as DVD devices and navigating services such as teletext. In all of these situations, where the audio/video stream is changed in response to the command data, it will be considered for the purpose of explaining the invention that the content of the audio/video stream is changed from the first content to a second content. Thus, following the examples given above, the second content will be the new live stream of television data, the paused or stopped images and images having the superimposed control information.

In the normal course, the audio/video stream having the second content would only be reproduced to the end user with the usual latency or buffering delay of for instance 3 seconds. The present invention considers control operations for the system described above to reduce this delay and improve operability for the user.

It should be appreciated that reference to an audio/video stream is in the broadest sense and changing the audio/video stream from a first content to a second content is intended to cover also switching between a first transport stream and a second transport stream; the second transport stream having a second content may be built as a second transport stream and the system switches between those streams.

When sending command data from the client device (14), it is possible merely to flush the buffer (24) of the client device (14) of any data. For the example where the command data initiates a channel change, it can be assumed that the user will not wish to see/hear any of the audio/video stream already in the buffer (24). However, there will also be subsequent parts of the audio/video stream upstream of the client device (14) which similarly, the user will not need to hear or see.

It is proposed that, upon detection of receipt of command data at the server (10), the controller (40) of the server (10) will flush the buffer (48) of the server (10). At the time of receipt of the command data at the server (10), any data of the audio/video stream already queued in the buffer (48) for transmission over the network (16) will relate to the first content, rather than the second content. Hence, this part of the audio/video stream is not required for reproduction to the user and can be flushed.

Having received the command data, the controller (40) of the server (10) responds either internally or by controlling the control interface (50) to operate one of the components of the television system (2). That component of television system (2) responds and an audio/video signal following that response is received by the audio/video interface (44) and processed by the processor (46) such that any new data passed to the buffer (48) and on to the network (16) forms the audio/video stream with the second content.

As a result of this arrangement, the client device (14) will only receive and reproduce for the user data of the audio/video stream relating to the first content which is actually in transit over the network (16). This is likely to be a very small amount of data and, indeed, for reasons which will be mentioned below, may well not be capable of reproduction anyway.

It will be appreciated that digital encoding of video sequences typically involves encoding a complete signal frame, known as an I frame at intervals of for instance 1 to 2 seconds. I frames contain intra macroblocks. The intervening frames are then encoded by inter-frame interpolation, i.e. interpolating between consecutive frames, to provide interpolated frames known as P and B frames. Although P and B frames may contain intra macroblocks, they mostly contain inter macroblocks (predicted or bi-predicted).

If a processor, such as processor (26) of the client device (14) is provided only with a P or B frame, it is not possible to reproduce the original image. It is always necessary for the processor to receive an I frame before receiving the consecutive P and B frames. Thus, if the system is arranged merely to flush the buffer (48) of the server (10) and the buffer (24) of the client device (14), it is quite likely that subsequent frames in transit on the network (16) will not be preceded by an appropriate I frame and, hence, will be dropped.

Following on from the above, it is preferable that, having received command data, the controller (40) of the server (10) controls the processor (46) such that any new audio/video signal from the audio/video interface (44) relating to the second content is encoded with the first frame being encoded as an I frame. Thus, the first frame of the audio/video stream having the second content is an I frame with only intra-frame interpellation such that the processor (26) of the client device (14) can reconstruct the original image for that frame.

As explained previously, the buffer (24) of the client device (14) is arranged to operate with a normal buffer delay time or latency intended to take account of any interruptions in, for example, the network (16). If the client device (14) waits until the buffer (24) has regained this normal buffering amount before reproduction of the audio/video stream is started, flushing of the buffer (24) provides no advantage in reducing the delay time. On the other hand, starting to reproduce the audio/video stream with second content immediately upon receipt and with no buffering will result in uneven reproduction because inevitably there will be some unevenness in receipt of data from the network (16). It is now proposed that, in this situation, the buffer (24) is caused to operate with a predetermined minimum buffer delay which is sufficient to take account of normal data flow variations over the network (16). In other words, during normal use when the network (16) is operating correctly, there will inevitably be fluctuations in data flow rates and the predetermined minimum buffer delay is intended to take account of these. On the other hand, the normal buffering delay time is intended to take account of the periodic, but less common, interruptions that occur in the network (16). In practice, it has been found that an appropriate value for the predetermined minimum buffering is 400 milliseconds worth of data. Depending upon the network, the values of 200 milliseconds or 100 milliseconds might be used. For poorer networks, values of 600, 800 or 1,000 milliseconds might be used.

It is thus proposed that the controller (20) of the client device (14), having sent the command data and flushed the buffer (24) of the client device (14), then causes the buffer (24) to buffer data up to the predetermined buffer time, for example 400 milliseconds, before the processor (26) reproduces the audio/video stream. In this way, the delay perceived by an end user is significantly reduced, but some buffering is provided to take account of the normal minimum variations in data flow rate experienced over the network (16).

Of course, the normal larger buffering delay time is used for good reason and, for a steady state audio/video stream, is preferred. Hence, it is desirable that the buffering provided by buffer (24) in the client device (14) is restored to the normal larger buffering time. To achieve this, it is proposed that the processor (26) reproduces the audio/video stream from the buffer (24) at a speed slightly slower than its originally intended speed. Playback at for example at 5% less than its original speed is suitable. While the processor (26) reproduces the audio/video stream at a slower than normal speed, the buffer (24) can be refilled and restored to its normal larger buffering time. Once the buffer (24) has returned to its normal buffering time, the processor (26) can return to reproducing the audio/video stream at a normal speed.

As a variation on the above, it is also possible for the same effect to be achieved by the server (10) providing the audio/video sequence at slow speed until the buffer (24) of the client device (14) has been refilled. In effect, the audio/video stream at the server (10) side is stretched and streamed over the network (16) to the buffer (24) of the client device (14) faster than real time.

As an improvement on the arrangement described above, it is proposed that the controller (40) of the server (10) having received command data from the client device (14), inserts marker data in the audio/video stream sent over the network (16) to indicate the start point of the audio/video stream having the second content. In this way, it becomes possible for the client device (14) to identify positively where in the audio/video stream the second content starts.

As mentioned above, reference to audio/video stream is in the broadest sense and is intended to cover any general stream of data carrying information from the server to the client device. The marker data can be used to indicate a change from one particular transport stream to another particular transport stream both considered conceptually to be within the same audio/video stream. On the other hand, it is also possible for marker data to be sent by means of quite a different channel. For instance, an "out-of-band" control message could be sent to identify the time when the content/transport stream changed. This could be achieved by sending the timestamp of the first new audio or video content to the client device or identifying the first new audio or video content in some other way, for instance packet number, packet count, frame count, etc. In the same way, the last old audio/video content could be identified and sent to the client device. "Out-of-band" need not necessarily mean the TCP feature with this name, but any additional socket connection used for control purposes, such as for example a special RTSP message.

Rather than flushing the buffer (24) of the client device (14) when sending the command data over the network (16), the client device (14) can wait until the marker data has been received from the server (10) before flushing the buffer (24). In this way, it is ensured that all of the audio/video stream having the first content, even that in transit on the network (16), is flushed or ignored by the client device (14). Furthermore, for the short period between sending the command data and receiving the marker data, the client device (14) can continue to reproduce the audio/video stream having the first content. Although the user may not particularly require reproduction of this part of the audio/video stream, reproduction in this way will help in the continuity of the service provided by the end user.

As explained above, in a preferred embodiment, the controller (20) of the client device (14) will still control the buffer (24) and processor (26) to wait until the predetermined minimum buffering, for instance 400 milliseconds, has been achieved before reproduction of the audio/video stream having second content is started. Of course, this will result in a slight interruption to reproduction to the end user, but interruptions of times of approximately 400 milliseconds will be familiar to users when initiating operations such as changing channels on television systems.

Where to add the marker data in the audio/video stream is not a straightforward matter. Client devices already exist which would not expect to receive marker data from the server (10). Hence, it is important that the marker data sent by the server (10) does not interfere with processes carried out by these client devices.

Interruptions to reproduction of an audio signal are normally more noticeable to an end user than slight deficiencies in the video signal. Hence, priority is given to the audio part of the audio/video stream. It is proposed, therefore, to include the marker data as part of the audio stream. In particular, it is proposed to introduce a dummy audio frame in which no audio data is carried. By replacing the standard header data of an audio frame with non-standard data indicating that a frame relates to marker data, a client device configured to receive and respond to marker data will recognise the audio frame as relating to marker data, whereas a client device not configured to receive marker data will merely consider the data to have been received in error and will drop the frame. In a system using audio frames with Real Time Protocol and AAC (Advanced Audio Codec) data, it is possible to replace the AAC header with a non-standard header signifying that the frame comprises marker data.

Another alternative is as follows. In some cases, the AAC header (called 'ADTS' header) is removed before streaming the audio frame such that it is not possible to replace it. Where there is no ADTS header, the following is proposed. AAC frames consist of several syntactic elements. The last element must be a TERM element (ID_END, 0b111). A frame that STARTS with TERM element seems to be suitable for use as a channel marker because it will be rejected by a standard decoder. After the TERM element, a data pattern can be hidden which can be recognised as a marker. Application of this marker is not limited to AAC data or indeed audio data in general and may be contained in video or other data packets.

The dummy audio frame will have a time stamp indicating its position in time within the audio stream. The controller (4) of the server (10) arranges for the time stamp of the audio frame containing the marker data to be immediately ahead of the time stamp of the first frame (actually an I frame) of the audio/video stream having the second content. Thus, in the client device (14), the controller (20) having identified the dummy audio frame for the marker data, can identify any subsequent data, having time stamps later than the time stamp of the dummy frame for the marker data, as being frames relating to the audio/video stream with the second content.

In another embodiment, the marker is not sent as an audio frame, but as a so-called 'out-of-band' signalling data. Out-of-band signalling is the exchange of information about the video stream, but separate from the audio or video data itself. For instance, on an embodiment using TCP, the marker can for instance be sent over a socket that is not used to transport audio or video data. In this embodiment, the marker would uniquely identify the time at which the server replaces a first content by a second content. This could for instance be achieved by including the timestamp of the first audio or video frame of the second content.

Following on from the above, an alternative is proposed in which the buffer (24) of the client device (14) is not flushed. Furthermore, with this alternative, it is possible to avoid the situation where no images are provided to the end user while the buffer (24) of the client device (14) builds up its predetermined minimum buffering amount, for example the 400 millisecond delay discussed above.

Having received the marker data at the client device (14), the controller (20) can allow the processor (26) to continue to reproduce the audio/video stream of first content from the buffer (24). The controller (20) controls the buffer (24) to build up the predetermined minimum buffering amount, for instance 400 milliseconds, of the audio/video stream of second content and then causes the processor (26) to ignore or skip the audio/video stream of first content as stored in the buffer (24). In particular, the controller (20) is able to identify all audio/video stream data of first content by means of the marker data indicating the start of the second content. For instance, by making use of the time stamp of the marker data, the controller (20) can identify data frames having earlier time stamps as being frames relating to the first content.

Thus, in one embodiment, emptying the buffer (24) of frames relating to the first content merely involves reading each frame from the buffer (24) in sequence and discarding all frames having time stamps before that of the marker data. This operation can be conducted very quickly without any need for the data contained in the frames to be processed.

As a further alternative, having received the marker data at the client device (14) and while the buffer (24) is building up the predetermined minimum buffer amount of the audio/video stream of the second content, the controller (20) can cause the processor (26) to reproduce the audio/video stream of first content in the buffer (24) at high speed, in other words at a fast-forward mode. The high speed could be a predetermined fixed high speed, for instance which, in general, will result in emptying the normal capacity of the buffer (24) in the time taken to acquire in the buffer (24) the predetermined minimum buffering amount of the audio/video stream of second content. Alternatively, the controller can consider how much data is currently being buffered in the buffer (24) and set the speed of reproduction so as to play out all of that data in the time of the predetermined minimum buffer amount.

For this and other arrangements described in the application, it should be appreciated that the predetermined minimum buffering amount can be chosen or changed adaptively. For example, when the user interface (32) of the client device (14) is first used to initiate the sending of command data to the server (10), the controller could try a relatively optimistic predetermined minimum buffering amount equivalent to for example 200 milliseconds of playback. If, in the changeover from first content to second content, the controller finds that the buffer (24) is fully emptied during the start of reproduction of the second content, then next time the user interface (32) is used to initiate the sending of command data and (new) first content (corresponding to the previous second content) is replaced by (new) second content, the controller can arrange for the buffer (24) to use a larger predetermined minimum buffering amount equivalent to for instance 400 milliseconds.

During the fast-forward playback operation, the video sequence is merely played at a higher speed than normal. The audio and video frames are synchronized by the timestamps which are generated by the server DSP. The client device determines whether or not a video frame is played out based on information of the timestamps. In consequence, playing audio faster systematically results in playing sequences of video frames faster. In order to reserve processing (CPU) power for some embodiments, such as embedded devices that do not possess a high computing power, for instance the Sony PSP (trademark), phone, etc, it may be desirable to skip all video frames which are non-IDR frames (in AVC streaming) or non I frames (in MPEG-4 streaming). For other computer devices, it may be desirable to play out all video frames with higher playout rate to produce smooth fast-forward playback.

The audio stream can be muted such that there is no audio output. Alternatively, the audio stream could also be played at high speed, with or without pitch control. In some embodiments the high speed audio stream is of reduced volume. As a further alternative, the audio stream could be replaced by a predefined audio signal, for instance generated within the client device (14), and for example being a fixed beep, jingle or sound that is associated with beaming something or accelerating something.

It is also possible to improve upon the basic system without using marker data.

In one arrangement, when the controller (20) of the client device (14) sends the command data to the server (10) it also arranges for the processor (26) to start playing or reproducing data from the buffer (24) at a high rate or, in other words, in fast-forward.

In one arrangement, the controller (20) causes the processor (26) to fast-forward an amount of data equal to the normal full buffering amount of the buffer (24). Preferably the fast-forward rate is such that, at the end of the operation, the buffer (24) has been filled with the predetermined minimum buffering amount of new data received over the network (16). This will generally correspond to the audio/video stream of the second content. As discussed above, the fast-forward rate can be fixed so as to reproduce the full buffering amount (for instance 3 seconds) in the time of the predetermined minimum buffering amount (for instance 400 milliseconds). Alternatively, the controller can assess how much data is in the buffer (24) and set the fast-forward rate so as to reproduce that data in the required time. Similarly, the predetermined minimum buffering amount can be chosen adaptively as described above.

As a further improvement, there is proposed an arrangement in which, when the controller (20) sends command data, the controller (20) determines the amount of data in the buffer (24) of the client device (14) and calculates a fast-forward play-out rate required to reproduce all of the data in the time of the predetermined minimum buffering amount, for instance 400 milliseconds. The processor (26) of the client device (14) is then controlled to reproduce data from the buffer (24) at that calculated fast-forward rate.

If, at the time of sending the command data and determining the amount of data in the buffer (24) of the client device (14), there is a backlog of data on the network (16) due to some interruption, it is likely that during the fast-forward reproduction process discussed above, more than the predetermined minimum buffering amount will arrive at the buffer (24) of the client device (14). For example, if the fast-forward reproduction rate was set so as to take 400 milliseconds, it is possible that, during that time, 500 milliseconds worth of data will be received by the buffer (24). Since the additional data received by the buffer (24) will almost certainly relate to the audio/video stream of first content, it is proposed that the controller (20) arranges for the processor (26) to continue to output the audio/video stream from the buffer (24) at the fast-forward rate. In particular, the high speed reproduction by the processor (26) is continued until the buffer (24) contains only the predetermined minimum buffering amount, for instance equivalent to 400 milliseconds.

Another improvement to the system can be to adjust the amount of data which is read out from the buffer at the fast forward rate according to an estimate of the network delays or latency. In other words, with an estimate of the network latency, it is possible for the client device to estimate how much additional data of the audio/video stream of the first content will be present on the network (and not yet received by the buffer 24) when the controller sends the command data. By outputting from the buffer 24 at the fast forward rate for an additional time equivalent to this data, a better estimate of fast forwarding through all of the audio/video stream of first content can be made.

It is possible for a user to input the required extra time on the basis of experience of using the client device on the network. Alternatively, the client device itself could monitor packet flow back and forth over the network to establish an estimate of the network latency. In one example, the client device could be configured to ping the server and monitor a response time. In other words, a packet could be created with useless information and sent to the server. As another example, Real-Time Transport Control Protocol (RTCP) can be used. This provides out-of-band control information for a Real-Time Transport Protocol (RTP) flow. As is well known, it is used periodically to transmit control packets to participants in a streaming multimedia session. Its primary function is to provide feedback on the quality of service being provided by the Real-Time Transport Protocol. Statistics are gathered on media connection.

The above arrangement provides an effective way of providing an end user with good and responsive feedback to operation of the user interface (32) with rapid change to the audio/video sequence of the second content.

It will be appreciated that, with all of the arrangements described above, when the buffering in the client device (14) is reduced to the predetermined minimum buffering amount, the system becomes more vulnerable to delays and problems in the network (16).

To help alleviate possible problems in this regard, it is proposed that the server (10) can be arranged such that the controller (40) controls the processor (46) to provide frames of the audio/video stream with a lower bit-rate. Although there will be a consequent drop in quality in the reproduction by the client device (14), this will be offset by improved performance in terms of reduced number of frame drops etc. The choice of using a reduced bit-rate or, indeed, the amount of reduction in bit-rate can be made by means of user selection or adaptively by the system determining whether or not excessive numbers of frame drops are occurring.

The description given above has considered generally only the situation where the system is in a steady-state playback state with an audio/video stream of a first content, command data is sent to the server (10) and the system moves on to another steady-state playback state with audio/video stream having a second content. With slow playback in the client device (14) to enable the buffer (24) of the client device (14) to return to its normal full buffering state, in general it is proposed to take for example two minutes to return again to the steady-state playback situation.

Of course, reference to first content and second content is intended to refer only to the audio/video stream before and after a particular respect command data.

In many cases, the user interface (32) of the client device (14) will be operated several times in quick succession. In this situation, preferably, the controller (20) of the client device (14) does not attempt to flush the buffer (24) each time it sends command data. Instead, it is sufficient merely to continue running the buffer (24) with the predetermined minimum buffering amount. Indeed, in this respect, the controller (20) could judge whether the buffer (24) contains an intermediate buffering amount (between the predetermined buffering amount and the normal buffering amount) and if the buffer (24) contains less than this intermediate amount (for instance less than one seconds worth of data) to take no action in terms of flushing the buffer (24) or providing fast-forward reproduction. When the server (10) flushes its buffer (48), a similar improvement may be incorporated. The server (10) will know that a second or further operation was initiated by command data in quick succession. Rather than flush the buffer (48) and generate an I frame, the controller (40) can be configured to do nothing where second, third, etc operations follow in quick succession.

In the embodiments described above, having reduced the amount of data in the client device buffer to the minimum predetermined amount, the client device then reproduces the audio/video stream in a slow-playback mode so as to allow the buffer slowly to be refilled. As an alternative, where the audio/video stream at the server end is non-real time, for instance it is prerecorded, perhaps on a PVR (personal video recorder) machine, then, subject to network restrictions, the data of the audio/video stream can be sent from the server to the client device at a rate faster than real-time so as to allow the buffer of the client device to be refilled. In this way, it is not necessary for the client device to reproduce data at a slow rate after a change from a first content to a second content.

Finally, it should be appreciated that FIGS. 3 and 4 are schematic representations of the functionality of the client device (14) and server (10). In practice, the latency or buffering present in these devices will be distributed through the devices. For instance, the client device (14) could be constructed with a network engine fed from the network (16) and connected to audio and video decoders by means of respective buffers. The audio and video decoders could then themselves be connected to respective audio and video renderers by means of further respective buffers. The arrangements as described above would then be implemented by ensuring that the total latency or buffer delays in any one signal path meets the requirements as discussed above. Flushing or skipping of data can occur in any one buffer along a particular signal path, but flushing or skipping data in buffers further upstream in the signal path has the advantage of avoiding processing of data that would otherwise have been passed downstream.

Figure 5:
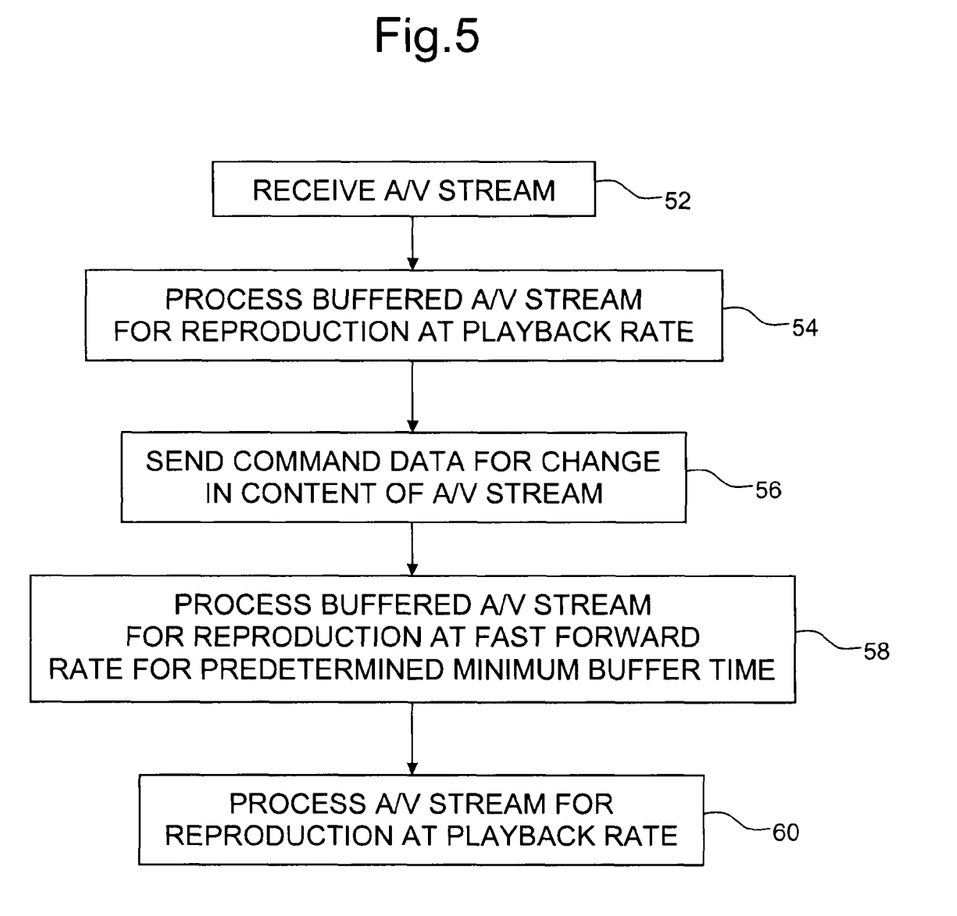
FIG. 5 is a flowchart that describes operation of a client device as in FIG. 3.

FIG. 5 is a flowchart that describes the operation of a client device as illustrated in FIG. 3. In particular, in Steps 52 and 54, the device receives an a/v stream and processes the buffered a/v stream for reproduction at a playback rate. In Step 56, the device sends command data for a change in content of the a/v stream. Upon sending the command data, the device processes the buffered a/v stream for reproduction at a fast-forward rate for at least a predetermined minimum buffer time in Step 58. Then, in Step 60, the device processes the a/v stream for reproduction at a playback rate.

We claim:

1. A client device for connection to a network and for reproducing an audio/video stream received from a server on the network, the client device including:
    an interface configured to connect to the network and to receive the audio/video stream when in communication with the network;
    a processor configured to process the received audio/video stream so as to enable reproduction at a playback rate; and
    a controller configured to send command data over the network to the server causing the server to provide a change in content of the audio/video stream from a first content to a second content wherein:
    the client device further includes a buffer configured to buffer the audio/video stream received from the network; and
    upon sending the command data, the controller is configured to control the processor to process the audio/video stream in the buffer so as to reproduce the audio/video stream at a fast forward rate higher than said playback rate for at least a predetermined minimum buffer time and subsequently to process the audio/video stream in the buffer for reproduction at the playback rate.

2. A client device according to claim 1 wherein, upon sending the command data, the controller is configured to control the processor to process the audio/video stream in the buffer so as to reproduce the audio/video stream at said fast forward rate and, if necessary, for any additional time required to reduce the buffered audio/video stream to an amount which, at the playback rate, has a playback time equal to the predetermined minimum buffer time.

3. A client device according to claim 1 wherein the controller is configured to calculate as the fast forward rate, a fast forward rate of reproduction of the audio/video stream in the buffer at the time of sending the command data required to empty the buffer in the predetermined minimum buffer time.

4. A client device according to claim 1 wherein the controller is configured to control the processor to process the audio/video stream in the buffer so as to reproduce the audio/video stream at a slow rate, slower than said playback rate, between controlling the processor to process at the fast forward rate and controlling the processor to process at the playback rate so as to enable refilling of the buffer.

5. A client device according to claim 1 wherein the controller is configured to process the audio/video stream so as to output the audio at reduced volume whilst reproducing the audio/video stream at the fast forward rate.

6. A system including a client device for connection to a network and for reproducing an audio/video stream received from a server on the network; wherein:
    the client device includes:
    an interface configured to connect to the network and to receive the audio/video stream when in communication with the network;
    a processor configured to process the received audio/video stream so as to enable reproduction at a playback rate; and
    a controller configured to send command data over the network to the server causing the server to provide a change in content of the audio/video stream from a first content to a second content wherein:
    the client device further includes a buffer configured to buffer the audio/video stream received from the network; and
    upon sending the command data, the controller is configured to control the processor to process the audio/video stream in the buffer so as to reproduce the audio/video stream at a fast forward rate higher than said playback rate for at least a predetermined minimum buffer time and subsequently to process the audio/video stream in the buffer for reproduction at the playback rate; and
    the server has:
    an interface configured to connect to the network and to provide an audio/video stream over the network when in communication with the network;

a processor configured to form data for the audio/video stream from an audio/video signal; and a controller in communication with the interface and configured to receive command data sent from the client device and to respond to the command data by controlling the processor to change the content of the audio/video stream from a first content to a second content.

7. A method of audio/video streaming including:

receiving an audio/video stream provided by a server over a network;

processing the received audio/video stream so as to enable reproduction at a playback rate; and sending command data over the network to the server causing the server to provide a change in content of the audio/video stream from a first content to a second content;

buffering, in a buffer, the audio/video stream received from the network;

upon sending the command data, processing the audio/video stream in the buffer so as to reproduce the audio/video stream at a fast forward rate for at least a predetermined minimum buffer time and subsequently processing the audio/video stream in the buffer for reproduction at the playback rate.

8. A method according to claim 7 further including:

upon sending the command data, processing the audio/video stream in the buffer so as to reproduce the audio/video stream at said fast forward rate and, if necessary, for any additional time required to reduce the buffered audio/video stream to an amount which, at the playback rate, has a playback time equal to the predetermined minimum buffer time.

9. A method according to claim 7 further including:

calculating as the fast forward rate, a fast forward rate of reproduction of the audio/video stream in the buffer at the time of sending the command data required to empty the buffer in the predetermined minimum time.

10. A method according to claim 7 further including:

processing the audio/video stream in the buffer so as to reproduce the audio/video stream at a slow rate, slower than said playback rate, between processing at the fast forward rate and the playback rate so as to enable refilling of the buffer.

11. A method according to claim 7 further including:

outputting audio at reduced volume while reproducing the audio/video stream at the fast forward rate.

12. A non-transitory computer readable medium comprising program code for performing, when said program is run on a client device, a method of audio/video streaming including:

receiving an audio/video stream provided by a server over a network;

processing the received audio/video stream so as to enable reproduction at a playback rate; and sending command data over the network to the server causing the server to provide a change in content of the audio/video stream from a first content to a second content;

buffering, in a buffer, the audio/video stream received from the network;

upon sending the command data, processing the audio/video stream in the buffer so as to reproduce the audio/video stream at a fast forward rate for at least a predetermined minimum buffer time and subsequently processing the audio/video stream in the buffer for reproduction at the playback rate.

13. A computer program product comprising program code stored on a non-transitory computer-readable medium for performing, when said program product is run on a client device, a method of audio/video streaming including:

receiving an audio/video stream provided by a server over a network;

processing the received audio/video stream so as to enable reproduction at a playback rate; and sending command data over the network to the server causing the server to provide a change in content of the audio/video stream from a first content to a second content;

buffering, in a buffer, the audio/video stream received from the network; upon sending the command data, processing the audio/video stream in the buffer so as to reproduce the audio/video stream at a fast forward rate for at least a predetermined minimum buffer time and subsequently processing the audio/video stream in the buffer for reproduction at the playback rate.

* * * * *